March 4, 1952  R. R. WINTER  2,587,799
UNIVERSAL SCRATCH GAUGE
Filed June 23, 1948  2 SHEETS—SHEET 1
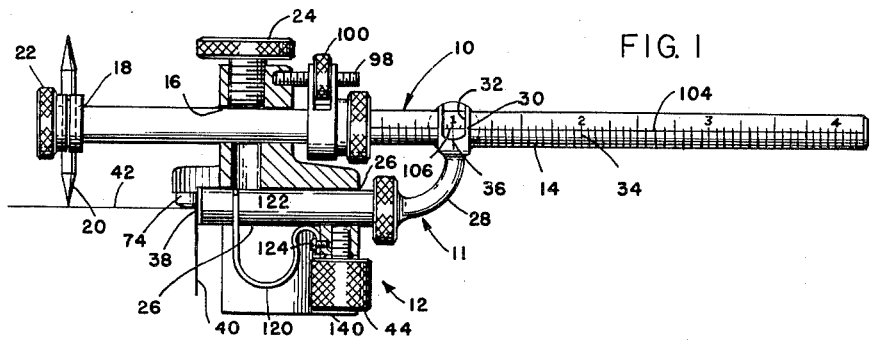
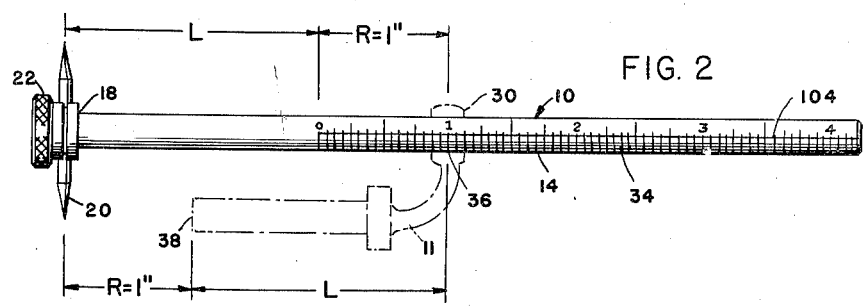
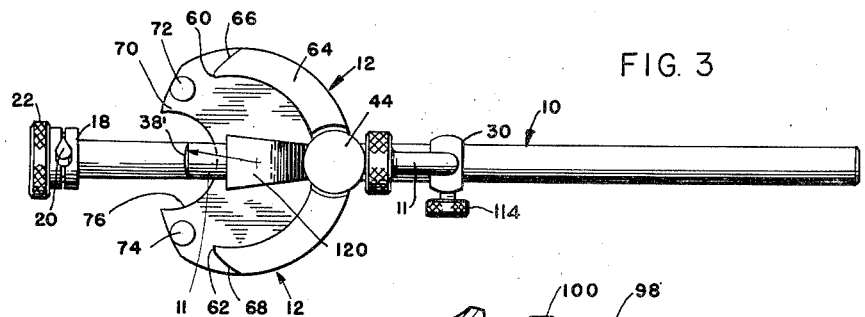
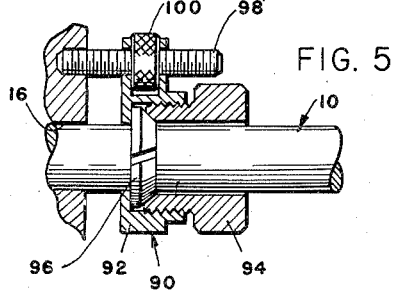
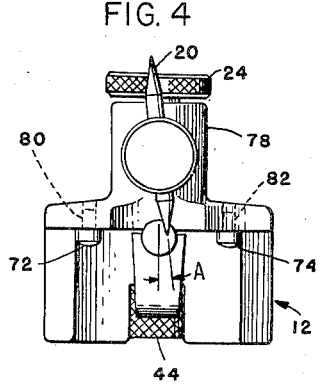
INVENTOR:
RUDOLPH R. WINTER
Carlson, Pitzner, Hubbard & Wolf
ATT'YS March 4, 1952  R. R. WINTER  2,587,799
UNIVERSAL SCRATCH GAUGE
Filed June 23, 1948  2 SHEETS—SHEET 2
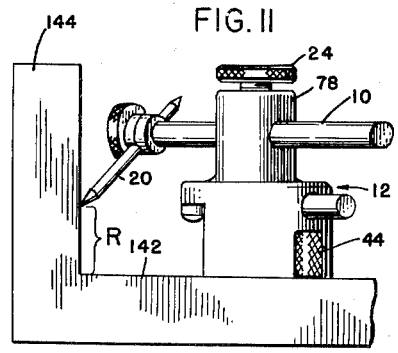
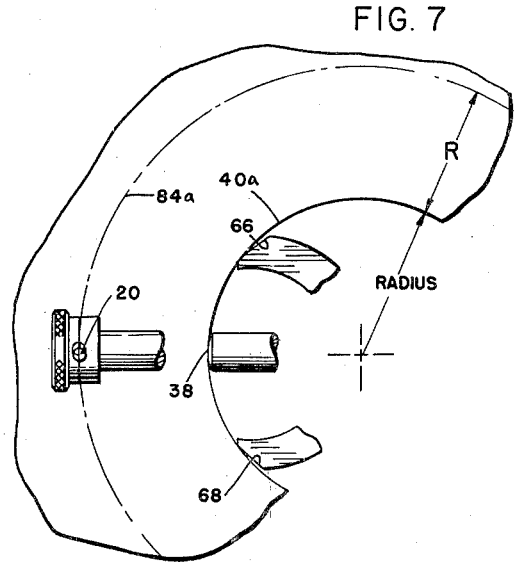
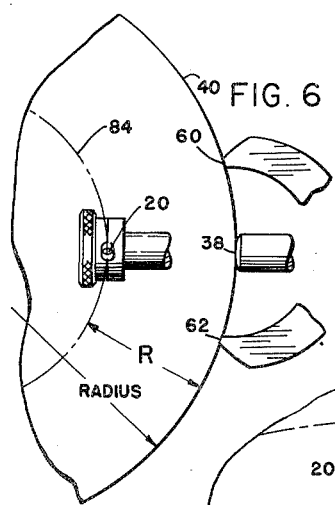
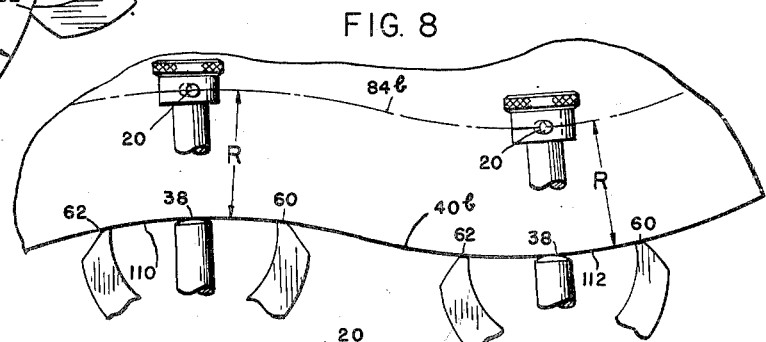
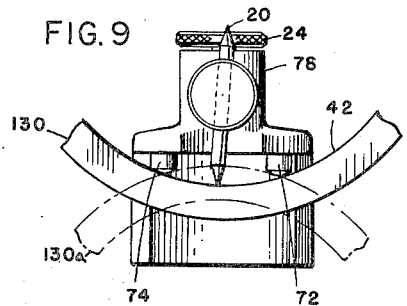
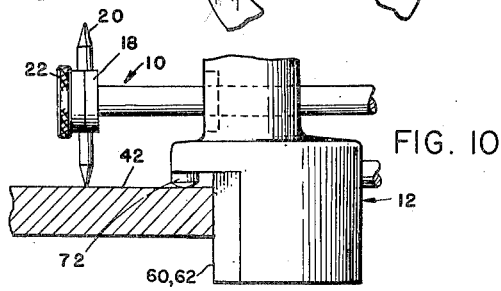
INVENTOR:
RUDOLPH R. WINTER
ATT'YS Patented Mar. 4, 1952

2,587,799

UNITED STATES PATENT OFFICE 2,587,799

UNIVERSAL SCRATCH GAUGE

Rudolph R. Winter, Chicago, Ill.

Application June 23, 1948, Serial No. 34,765

10 Claims. (Cl. 33—42)

The present invention relates to scratch gauges and more particularly to a machinist's scratch gauge capable of working from a curved reference surface.

It is an object of the present invention to provide a scratch gauge which may be adjusted to strike off a predetermined dimension on a workpiece regardless of whether a concave or convex surface is employed for reference purposes. It is a more detailed object to provide a scratch gauge which may be used to inscribe a line a given distance from the edge of a workpiece employing a single direct reading setting of dimension and in spite of variations in curvature from point to point along the edge.

It is another object of the invention to provide a scratch gauge capable of working from a curved reference surface and which is particularly well suited for scribing a line on a work surface which is of itself curved.

It is a further object to provide a scratch gauge which is also inherently well adapted to perform the functions normally performed by a conventional surface gauge.

It is still another object to provide a scratch gauge including an improved scriber arrangement in which the scriber may be readily positioned to bear a predetermined angular relationship with respect to the work or adjusted to any other angular position within a wide range.

In one of its aspects it is an object to provide a calibrated scratch gauge having an improved arrangement for effecting fine adjustment and clamping of the scriber bar.

Other objects and advantages of the invention will become apparent from the following detailed description taken in connection with the accompanying drawings, in which:

Figure 1 is a vertical section of a scratch gauge constructed in accordance with the present invention.

Fig. 2 shows the scriber bar and associated gauge bar with the remainder of the gauge removed to bring out the essential dimensional relationships.

Fig. 3 is a bottom view of the scratch gauge disclosed in Fig. 1.

Fig. 4 is a front elevation of the scratch gauge shown in the preceding figures.

Fig. 5 is a fragmentary view showing the means here employed for the clamping and fine adjustment of the scriber bar.

Fig. 6 shows the improved scratch gauge acting upon a convexly curved reference surface.

Fig. 7 is a diagrammatic view showing the scratch gauge riding upon a concave cylindrical surface.

Fig. 8 discloses a scratch gauge in two positions on a reference surface having compound curvature.

Fig. 9 is a front view in elevation showing the scratch gauge operating upon a curved work surface and disclosing particularly the function of the ball guides.

Fig. 10 is a fragmentary side view of the scratch gauge and workpiece shown in Fig. 9.

Fig. 11 is a view taken in elevation and showing the scratch gauge employed in the manner of a conventional surface gauge.

While the invention is susceptible of various modifications and alternative constructions and uses, I have shown in the drawings and will herein describe in detail one embodiment of the invention. It is to be understood, however, that I do not intend to limit the invention by such disclosure, but aim to cover all modifications and alternative constructions and uses falling within the spirit and scope of the invention as expressed in the appended claims.

Referring now to the drawings it will be observed that the scriber includes a scriber bar 10, a gauge bar 11 and a mounting block 12. The scriber bar 10 has a body portion 14 which is slidingly received in a bore or channel 16 in the block. Mounted at the end of the scriber bar is a scriber chuck 18 in which a scriber 20 is arranged perpendicularly to the axis of the bar. A thumb screw 22 enables the scriber 20 to be adjusted longitudinally and thereafter clamped securely in place.

The above-described combination of scriber bar and block, together with a simple locking arrangement such as a thumb screw 24 at the top of the block, corresponds in general with conventional scratch gauges, particularly those used in woodworking and carpentry. Such gauges have not been considered sufficiently universal in application no sufficiently accurate to justify widespread use in machine shops. This will become apparent when the normal mode of using a device of this type is considered. Conventionally, the block is abutted against the edge of a workpiece with the scriber bar extended to an adjusted position for scribing a line at a predetermined distance from the edge. If the block is formed so as to present a flat surface to the workpiece, use on curved reference surfaces becomes impracticable because of the rocking of the block about the point of contact. In an endeavor to prevent the error introduced by such rocking movement, scratch gauges have been constructed in the past providing two points of contact which are spaced on either side of the scriber bar. While such construction eliminates the rocking error, it makes it impossible to calibrate the scriber bar 10 except for use with reference surfaces having a predetermined and constant degree of curvature. This makes it necessary when using such a device on internal and external cylindrical surfaces to lay off the desired radius by some auxiliary means on the workpiece and then to clamp the scriber bar in a corresponding extended position. The latter not only requires additional layout time but is completely impracticable where the curvature varies from point to point along the surface to be followed by the gauge.

In accordance with the present invention the above difficulties are effectively overcome by a compensating arrangement including a gauge bar 11 which is slidingly received in a bore or channel 26 parallel to the bore 16 in the block 12. Such gauge bar has an extension 28 carrying a collar 30 thereon which is telescoped over the body 14 of the scriber bar. Such collar preferably has an aperture or window 32 for viewing calibration markings 34 which are marked off on the scriber bar. The relative axial position of the gauge bar with respect to the scriber bar is indicated on the scale 34 by means of an index or pointer 36. The gauge bar 11 further includes a localizing contact surface in the form of a hardened tip 38 which is preferably of a radius considerably smaller than any concave reference surface likely to be encountered. The latter is adapted to engage the reference surface or edge 40 of a workpiece when the scriber 20 is in scribing position on the work surface 42. A recessed thumb screw 44 is threadedly received in the block 12 serving to clamp the gauge bar 11 into a desired position relative to the block.

Prior to describing the manner in which the above-described device is employed, it will be helpful to refer in greater detail to the construction of the block 12, particularly as set forth in Figs. 1, 3 and 4. The central or body portion of the block is recessed to provide work contacting guide surfaces or edges 60, 62 which straddle the bar 10 and are spaced equidistant therefrom. The wall 64 supporting the edges is generally C-shaped being bevelled at 66, 68 for a purpose which will later appear. Extending outwardly above the contacting edges 60, 62 is a flange 70 having a pair of downwardly extending contact buttons 72, 74 thereon. The latter present a polished spherical surface and may be referred to as ball guides. The flange 70 is preferably scalloped out or recessed as indicated at 76 in order to enable the scriber 20 to be retracted inwardly of the outer edge of the flange to a point almost alined with the contact edges 60, 62. Completing the description of the block 12, it includes an upright portion or post 78 which extends above the level of the flange 70. As will be apparent to one skilled in the art the various portions of the block may be formed integrally, for example, by casting steel or similar wear-resistant metal. The contact buttons 72, 74 as shown in Fig. 4 may be removable and in the present instance are frictionally retained in vertical bores 80, 82 in the casting with insertion from the top possible.

In employing the invention as thus far described to a workpiece having a curved reference surface (such as that indicated at 40 in Fig. 1), both of the thumb screws 24, 44 are released to leave the scriber bar 10 and the gauge bar 11 free to move. The contact edges 60, 62 (Fig. 3) are next brought into abutting contact with the reference surface and held thereagainst while the gauge bar 11 is pushed forwardly into contact with the reference surface. The gauge bar is then clamped in position by tightening the thumb screw 44. This provides three points of contact with the work, namely, the contact edges 60, 62 and the tip 38 on the gauge bar. Next, the scriber bar 10 is extended so that a predetermined distance exists between the tip 38 on the gauge bar and the tip of the scriber 20, whereupon the thumb screw 24 is tightened. The resulting relationship of the parts is shown more or less diagrammatically in Fig. 6 which discloses a cylindrical reference surface. It will be apparent that the scratch gauge may now be moved in an arcuate path about the reference surface 40 to scratch an arcuate line 84 in the work surface. Since the multiple points of contact prevent any rocking whatsoever of the gauge on the work, the human error is removed and extreme accuracy may be achieved.

In the case of internal surfaces of cylindrical shape such as indicated at 40a in Fig. 7, the set-up procedure is the same as in Fig. 6. That is to say, the contact edges 60, 62 are brought into contact with the work, after which the gauge bar 11 is advanced and clamped into place. Next the scriber bar 10 is extended and clamped in a position which will produce an inscribed line 84a which is at a constant radius from the concave reference surface 40a. It will be apparent in Fig. 7 that the bevelling or chamfering of the block as indicated at 66, 68 enables the gauge to be inserted into bores of relatively small radius.

In accordance with one of the novel features of the invention, the zero point on the scale 34 is offset from the point or axis of the scriber 20 by an amount L which is precisely equal to the effective length of the gauge bar. As shown in Fig. 2, this length is measured horizontally between the tip 38 and the reference index 36. In the present instance an offset of two inches has been taken as exemplary, and the gauge bar has been positioned relatively to the scriber bar to produce a radial gauge distance R corresponding to the radial distance marked off in Figs. 6 and 7 referred to above. It is readily possible to check the validity of the dimensional relationship between the zero offset and the length of the gauge bar merely upon reference to Fig. 2. It will be noted that upon moving the gauge bar 11 all the way to the left, the tip 38 of the gauge bar and the tip of the scriber 20 will be in alinement when zero is indicated by the reference index 36. Conversely, when the gauge bar is adjusted rearwardly on the scriber bar 10, the distance indicated on the scale 34 always corresponds to the radial distance R struck off on the workpiece. It is important to note that this relationship is entirely independent of the position of the block 12 relative to the bars 10 and 11. That is to say, the block 12 may be relatively adjusted for convex curvature as disclosed in Fig. 6 or for concave curvature as disclosed in Fig. 7 without in any way affecting the direct reading of the distance R on the scale 34.

In the above discussion it was assumed that the scriber bar had been extended to an exactly predetermined position. To facilitate such adjustment, a fine adjustment mechanism 90 is included in the scratch gauge being shown in the enlarged sectional view, Fig. 5. Such mechanism includes a clamp assembly 92 which is slidingly telescoped over the body portion 14 of the scriber bar. Such clamp includes a knurled packing nut 94 and a split ring 96. It will be apparent that as the packing nut is advanced toward the split ring, the latter will be squeezed radially inward upon the scriber bar, serving to grip it without any tendency for the bar to turn with the nut.

To advance the bar 10 relative to the block 12 a stud 98 is provided having a knurled travelling nut 100 thereon which is embraced by a portion of the clamp. In operation, the packing nut 94 is rotated to clamp the bar 10 in an approximate setting. The travelling nut 100 is then rotated to move the assembly with a vernier-like action in one direction or the other until the scriber bar is precisely positioned relative to the scale index. If desired, the window 32 may be widened somewhat to allow a vernier scale to be placed adjacent the index.

In accordance with one of the more detailed aspects of the invention means are provided for angling the scriber a predetermined amount relative to the vertical axis of the block, such angle being shown at A in Fig. 4. To accomplish this a longitudinal line 104 is engraved in the scriber bar 10. This line cooperates with the lower edge of the window 32 on the gauge bar. This edge is parallel to the line 104 and has been indicated at 106. The arrangement is such that with the line 104 alined with the edge 106 the scriber will always make an angle A with the work. This is of advantage since it enables the point of the scriber to be smoothly drawn along the work surface and eliminates any tendency towards gouging or chattering which may occur particularly where it is necessary to inscribe a line on relatively soft material.

*Modified construction for use on reference surfaces having compound curvature*

In the above simplified construction it was assumed that the reference surfaces are of constant curvature from point to point, external and internal cylindrical surfaces being disclosed in Figs. 6 and 7 respectively. While surfaces of constant curvature are frequently encountered in machine shop practice, a large number of instances may arise in which the curvature is not constant but varies from point to point. An example of such a reference surface is shown diagrammatically at 40b in Fig. 8. Two positions of the scratch gauge are shown: The first corresponds to concave curvature and is indicated at 110, and the other corresponds to convex curvature indicated at 112. In order to enable the scratch gauge to adapt itself automatically to such curvatures and to intermediate values of curvature as well, means are provided for jointly moving the scriber bar 10 and gauge bar 11 as a rigid unit relatively to the block 12. In the present instance this has been simply accomplished by providing a thumb screw 114 (Fig. 3) which is threadedly received in the collar 30 at the right-hand end of the gauge bar 11. When the thumb screw 114 is employed the thumb screws 24, 44 in the block 12 and the packing nut 94 are retracted, enabling the two bars 10, 11 to slide as a unit. In practicing the invention means are also provided for biasing the bars outwardly with respect to the block, that is, to the left as viewed in Figs. 1 to 3. In the present instance the biasing force is derived from a leaf spring 120 which is generally S-shaped having one end received in an annular slot 122 machined on the gauge bar and having the other end fastened to the wall 64 of the block 12 by means of a machine screw 124 or the like.

Prior to the use of the complete gauge on a compound surface, such as disclosed in Fig. 8, the thumb screw 114 is loosened and the index 36 is adjusted on the scale 34 to indicate a desired radial distance R. The thumb screw 114 is then tightened and the contact edges 60, 62 of the block are brought into contact with the reference surface 40b on the workpiece. Assuming that the knurled screws 24, 44 are retracted and that the packing nut 94 is disengaged, it will be apparent that the gauge bar 11 will be urged into intimate contact with the reference surface by the leaf spring 120. To inscribe a line 84b, the block 12 is advanced in a more or less arcuate path in the direction indicated by the arrow in Fig. 8. As an incident to such movement the gauge bar will move into the block 12 by an amount which is exactly sufficient to compensate for the variation in curvature. This will cause the line 84b inscribed in the work surface to be spaced from the reference surface 40b at a constant difference R.

If desired, the gauge may be used on workpieces in which the edge curvature changes much more sharply than illustrated. In extreme cases, however, it may be necessary to reduce the span of the contact edges 60, 62 somewhat to insure that the axis of the scriber bar may be at all times substantially perpendicular to an imaginary tangent drawn at the point of contact of the gauge bar.

It is seen that a formerly tedious layout job is reduced to one of utmost simplicity. After the desired radial distance R has been set on the scale 34 no additional care is required, and the compensation for curvature is entirely automatic. As a result the cost of accurate layout work of this type may be greatly reduced and may be efficiently performed with utmost accuracy even with inexperienced personnel.

*Use of scratch gauge on curved work surface*

In the preceding discussion a curved reference surface and flat work surface have been assumed. The use of the gauge is, however, by no means limited to scratching of flat surfaces as will be apparent upon inspection of Figs. 9 and 10. Here a workpiece indicated at 130 must be inscribed on a curved upwardly facing surface by a line which is spaced at a distance R from the end of the piece. To do this it is merely necessary to set the index 36 to indicate the desired distance R on the scale 34, subsequently clamping the bars in place by means of the associated thumb screws 24, 44. The scratch gauge is then arranged with the contact edges 60, 62 abutting the edge of the work and with the contact buttons 72, 74 brought into engagement with the work surface. The scratch gauge may then be arcuately moved along the work surface riding on the contact buttons 72, 74 to produce the desired inscribed line. In the case of a piece having the work surface thereon oppositely curved, as shown at 130a in Fig. 9, it is merely necessary to retract the scriber 20 somewhat, which latter may be effected by loosening the scriber clamping screw 22. Since the axis of the scriber 20 is at all times perpendicular to the axis of the scriber bar 10, the latter movement will not in any way effect the accuracy or validity of the reading on the scale 34. Inscribing the line may then be accomplished by moving the scratch gauge in an arcuate path just as in the case of the workpiece 130.

Use as surface gauge

To further increase the flexibility of use, provision is made for employing the circle scratch gauge in the manner of a conventional surface gauge. To this end the block 12 has machined on its bottom face a plane and hardened surface 140 which is preferably parallel to the axis of the scriber bar 10. The thumb screw 44, it will be noted, is recessed in the bottom of the block 12, so that the surface 140 is uninterrupted. In use the surface 140 (see Fig. 11) is placed in contact with the machined reference surface, for example, surface 142 on a workpiece 144. A desired distance R is laid off at an elevation above the machine surface 142 on the workpiece and the thumb screw 24 is loosened to enable the scriber bar to be oriented in the position illustrated in Fig. 11 after which the scriber bar is again tightened. The scratch gauge is then moved at right angles to the plane of the drawing to produce an inscribed line at the predetermined elevation R. If desired, the scriber 20 may be replaced by one of greater length for certain applications. Also, the scriber 20 may be replaced by one having an offset or L-shaped tip (not shown) of the type employed in conventional surface gauges.

I claim as my invention:

1. A scratch gauge having a block providing a pair of forwardly projecting surfaces for riding along a reference surface on a workpiece, a scriber bar slidably received in said block and generally centered between the surfaces on the block for extending over said workpiece, a gauge bar slidably received in said block and having a forwardly presented contact surface at one end, said gauge bar having an offset portion extending adjacent said scriber bar, said scriber bar having a scale inscribed along the length thereof and said offset portion having an index pointer for cooperating with said scale to indicate the amount of extension of said scriber beyond the contact surface on said gauge bar, and a spring engaging said gauge bar for pressing the latter forwardly into contact with said reference surface.

2. A scratch gauge comprising a scriber bar having a scriber projecting at right angles at one end thereof, a scale on said scriber bar having its zero point offset from said scriber and reading progressively along the length thereof, a gauge bar, a mounting block for slidably receiving said bars, said gauge bar being arranged for movement parallel to said scriber bar, means for clamping the bars together in adjusted relation for sliding movement of the two bars in said mounting block as a unit, said gauge bar having a contacting surface at one end for riding on the edge of a workpiece and an index pointer at the other end for cooperating with said scale, the distance between said work contacting surfaces and said index point being equal to the amount that the zero point is offset on said scriber bar, said mounting block providing an additional point of contact with the edge of the workpiece so that the scriber bar is maintained generally perpendicular thereto, said scriber bar being of circular cross-section to enable said scriber bar to be rotated about its own axis for adjustment of the angle that the scriber makes with the workpiece.

3. A scratch gauge comprising a scriber bar having a scriber thereon, a gauge bar having a contact surface for riding along a reference surface on a workpiece, a mounting block for said bars having parallel bores therein for the sliding reception of said bars, means including a scale on one of said bars and an index pointer on the other for indicating the distance between said contact surface and said scriber, means for clamping the bars relative to one another, said block having a pair of contact edges spaced approximately equidistant from the contact surface on said gauge bar for preventing rocking movement of the gauge on said workpiece.

4. A scratch gauge comprising a C-shaped mounting block having a pair of forwardly projecting arms for riding on a reference surface of a workpiece, a scriber bar having a scriber thereon and mounted for sliding movement between said arms, means including a gauge bar slidably adjustable in said block between said arms for riding on said reference surface and providing a third point of contact therewith, means including a scale on one of said bars and an index pointer on the other for direct indication of the distance between said scriber and the reference surface on the workpiece, means for clamping said bars for movement as a unit relatively to said block, and biasing means for urging said bars in the direction of the workpiece.

5. A scratch gauge having a block providing a pair of forwardly projecting surfaces for riding along a reference surface on a workpiece, a scriber bar slidably received in said block and generally centered between said contact surfaces for extending over said workpiece, a gauge bar slidably received in said block and having a forwardly presented contact surface at one end, said gauge bar having an offset portion at its other end extending adjacent said scriber bar, said scriber bar having a scale inscribed along the length thereof and said offset portion having an index pointer for cooperating with said scale to indicate the amount of extension of said scriber beyond the contact surface on said gauge bar.

6. A scratch gauge comprising a mounting block having a plurality of forwardly projecting contact surfaces for engaging the edge of a workpiece, a scriber bar slidably received in said block for extending over a work piece and for movement perpendicularly to the edge thereof, an L-shaped gauge bar having one leg slidably received in said block for movement parallel to said scriber bar for engaging said edge of said workpiece and having a second leg including a collar at the end thereof for encircling said scriber bar, said scriber bar having a scale along the length thereof and said collar having an index thereon for indicating the amount of extension of said scriber relative to the edge of the workpiece, and a set screw in said collar enabling said bars to be clamped together for movement as a unit relative to said block.

7. A scratch gauge comprising a scriber bar having a scriber projecting laterally at the outer end thereof, a gauge bar arranged parallel to said scriber bar and having a localized contact surface for riding on a reference surface on a workpiece so that the scriber scratches a line on said workpiece which is parallel to said reference surface, means for mounting said bars for relative sliding movement parallel to one another, scale means including a scale and cooperating pointer associated with said bars for indicating the distance between the point of said scriber and the contact surface on said gauge bar, means including a manually operated clamping member for clamping the bars together in an adjusted position relative to one another for bodily movement of both of them as a unit, and a mounting block having means for adjustably fixing the same to at least one of said bars and providing a pair of guide surfaces straddling the contact surface on said gauge bar for engaging said reference surface and maintaining said scriber bar perpendicular to the reference surface as said scriber is moved therealong.

8. A scratch gauge comprising a scriber bar having a scriber thereon, a gauge bar having a contact surface for riding along a reference surface on a workpiece, a mounting block for said bars having parallel channels therein for the sliding reception of said bars, means including a scale on one of said bars and an index pointer on the other for indicating the distance between said contact surface and said scriber, means including a manually operable clamping member for interconnecting said bars and for maintaining the bars in an adjusted position relative to one another for bodily movement of the two of them as a unit in said mounting block, said block having a pair of guide surfaces spaced approximately equidistant from the contact surface on said gauge bar, and means for clamping said bars in said block with said contact surface and the guide surfaces in contact with the reference surface on the workpiece to provide a three-point support and thus prevent rocking of the gauge thereon.

9. A scratch gauge for a workpiece having a face and an edge comprising, in combination, a scriber bar having a scriber projecting laterally at one end thereof, a gauge bar having a localized contact surface at one end for riding along the edge of the workpiece, a mounting block for slidably mounting said bars parallel to one another with the scriber overhanging said face, guide surfaces on said mounting block for engaging not only the edge of the workpiece but also the face of the workpiece to prevent rocking of the mounting block, means including a scale for indicating the distance between the contact surface and the scriber, means for clamping the bars together in an adjusted position relative to one another to enable the scribing of a line on said workpiece the indicated amount inwardly from the edge thereof, and a spring mounted in said mounting block and arranged to urge said gauge bar and the associated scriber bar outwardly therefrom so that said gauge bar is urged into contact with the edge of the workpiece.

10. A scratch gauge for a workpiece having a face and an edge comprising, in combination, a scriber bar having a scriber projecting laterally at one end thereof, a gauge bar having a localized contact surface at one end for riding along the edge of the workpiece, a mounting block for slidably mounting said bars parallel to one another with the scriber overhanging said face, guide surfaces on said mounting block for engaging the edge of the workpiece to prevent rocking of the mounting block, means including a scale on one of said bars and an index pointer on the other for indicating the distance between the contact surface and the scriber, a spring mounted in said mounting block and arranged to urge the gauge bar outwardly therefrom and into contact with the edge of the workpiece, a gauge bar clamp for clamping the gauge bar to the mounting block when the guide surface on the mounting block and the end of the gauge bar are all in contact with the edge of the workpiece, a scriber bar clamp for clamping said scriber bar in said mounting block to enable the scribing of a line on the face of said workpiece an indicated amount inwardly from the edge thereof, and a micrometer adjustment included in said scriber bar clamp and operative when the scriber bar is clamped in said mounting block for precise adjustment of said scriber bar in said mounting block.

RUDOLPH R. WINTER.

REFERENCES CITED

The following references are of record in the file of this patent:

UNITED STATES PATENTS

| Number | Name | Date |
| --- | --- | --- |
| 79,052 | Blaisdell | June 23, 1868 |
| 379,117 | Lycett | Mar. 6, 1888 |
| 569,739 | Bates | Oct. 20, 1896 |
| 915,219 | Regelson | Mar. 16, 1909 |
| 1,195,886 | Wheeler | Aug. 22, 1916 |
| 1,577,569 | Donley | Mar. 23, 1926 |
| 2,355,585 | Halstead | Aug. 8, 1944 |

FOREIGN PATENTS

| Number | Country | Date |
| --- | --- | --- |
| 79,052 | Great Britain | 1895 |
| 587,346 | Great Britain | Apr. 22, 1947 |